United States Patent [19]

Ichikawa

[11] Patent Number: 5,057,678
[45] Date of Patent: Oct. 15, 1991

[54] MAGNETIC SENSOR AND CARD READER CONTAINING IT

[75] Inventor: Yoshiaki Ichikawa, Saitama, Japan

[73] Assignee: Hitachi Metals, Ltd., Tokyo, Japan

[21] Appl. No.: 361,202

[22] Filed: Jun. 5, 1989

[30] Foreign Application Priority Data

Jun. 9, 1988 [JP] Japan .................. 63-142422
Jul. 11, 1988 [JP] Japan .................. 63-172417
Oct. 7, 1988 [JP] Japan .................. 63-253032

[51] Int. Cl.$^5$ .......................... G06K 9/18; G06K 9/28; G11B 21/03
[52] U.S. Cl. .................................. 235/449; 235/474; 360/121
[58] Field of Search ............... 235/449, 474, 475, 476, 235/481; 360/121

[56] References Cited

U.S. PATENT DOCUMENTS

| | | | |
|---|---|---|---|
| 3,549,822 | 12/1970 | Chupity ............................ | 360/121 |
| 3,914,789 | 10/1975 | Coker, Jr. et al. ................. | 360/121 |
| 3,920,960 | 11/1975 | Ditman ............................. | 360/121 |
| 3,949,193 | 4/1976 | Dowdell ........................... | 235/474 |
| 4,275,428 | 6/1981 | Lehureau .......................... | 360/121 |
| 4,304,992 | 12/1981 | Kobayashi et al. ................. | 235/449 |
| 4,345,278 | 8/1982 | Double ............................. | 235/474 |
| 4,390,905 | 6/1983 | Tokitsu ............................ | 235/436 |
| 4,460,934 | 7/1984 | Yamada ............................ | 360/121 |
| 4,593,328 | 6/1986 | Baus, Jr. .......................... | 235/482 |
| 4,605,843 | 8/1986 | Aubrey ............................. | 235/475 |
| 4,812,924 | 3/1989 | Fukami et al. .................... | 360/121 |
| 4,827,218 | 5/1989 | Meunier et al. ................... | 235/450 |

FOREIGN PATENT DOCUMENTS 57-5067 1/1982 Japan .
62-49213 1/1982 Japan .

OTHER PUBLICATIONS

National Technical Report, vol. 31, No. 2, pp. 49–55 (1985).
Omron Technics, vol. 26, No. 3, 8 pp., and Abridged Translation, 1986.

Primary Examiner—Stuart S. Levy
Assistant Examiner—Richard Weinberg

[57] ABSTRACT

A magnetic sensor comprising a rotatable magnetic disc provided on its circular surface with a circular magnet belt having N and S magnetic poles alternately at a constant pitch; and a sensor means comprising a support and at least one sensor element having a plurality of magnetoresistive portions fixed to one or both surfaces of the support, the magnetoresistive portions being connected to each other in series and arranged radially at a constant interval in a point-symmetric manner on the support. This magnetic sensor is assembled in a card reader in which the magnetic disc serves as a roller rotatable with a card.

9 Claims, 7 Drawing Sheets 4  5  4'  18 19

5,057,678

MAGNETIC SENSOR AND CARD READER CONTAINING IT

BACKGROUND OF THE INVENTION

The present invention relates to a magnetic sensor for use in magnetic encoders, tacho-generators, card readers, etc., and more particularly to a magnetoresistance-type magnetic sensor and a card reader comprising such a magnetoresistance-type magnetic sensor.

A magnetoresistance-type magnetic sensor (hereinafter referred to simply as "magnetic sensor") is an element for converting a periodic magnetic field variation to the variation of output voltage by utilizing the phenomenon that a magnetoresistive material's resistance varies depending upon the intensity of an external magnetic field. For instance, see Japanese Patent Publication No. 57-5067.

As rotatable means for generating a periodic change of a magnetic field, magnetic discs such as shown in FIG. 14 and magnetic drums such as shown in FIG. 15 are already known. The magnetic disc 2 has a magnet belt having a larger number of magnetic poles on its surface and is rotatable by a center shaft 3. The magnetic poles are opposing to a sensor means 1 with an extremely small distance to detect the variation of a magnetic field generated from the disc surface. On the other hand, the magnetic drum 50 has a magnet belt having a large number of magnetic poles on its cylindrical side surface and is rotatable by a center shaft 3. Similarly, the magnetic poles are opposing to a sensor means 1 with an extremely small distance to detect the variation of a magnetic field generated from the drum surface.

Since the magnetic drum-type rotatable means has a large thickness, it is not suitable for miniaturization. On the other hand, the magnetic disc-type rotatable means may be extremely thin because its magnetic field-generating portion is located on one of the flat, circular surfaces of the disc.

In the magnetic sensor of the above structure as shown in FIG. 14, however, there is a problem that the slightest inclination of a rotation axis of the magnetic disc 2 causes the wobbling of the magnetic disc 2, which leads to a relatively large variation in the distance between the disc surface and the sensor means 1 opposing thereto. This variation is exemplified in FIGS. 13 A and B in an exaggerated manner. That is, in FIG. 13 A, the distance between the disc surface and the sensor means 1 is small, while that distance is large in FIG. 13 B. Accordingly, an output voltage amplitude is relatively large in the case of FIG. 13 A, while it is relatively small in the case of FIG. 13 B. The cases of FIGS. 13 A and B take place alternatingly as the magnetic disc rotates, resulting in the periodic variation of an output voltage amplitude. Therefore, it is difficult to provide an output voltage having a constant amplitude with the magnetic disc-type rotatable means.

In addition, since the sensor means provided with the sensor element is positioned as close to the magnetic disc as 10 μm–3 mm, particularly 10–200 μm or so, the terminals and solder portions on the sensor support, which have a relatively larger thickness, are likely to collide with the disc surface, even if the magnetic disc undergoes the slightest wobbling. Accordingly, it is necessary to make sure that the terminals and solder portions of the sensor element would never collide the disc surface even if there is some wobbling in the magnetic disc.

Further, the magnetic disc-type magnetic sensor is suitable for use in a card reader in which a rotary means rotatable synchronously with the card provides a signal showing the position of the card.

OBJECT AND SUMMARY OF THE INVENTION

An object of the present invention is, accordingly, to provide a magnetic sensor capable of providing an output signal having a constant amplitude without suffering from the above-mentioned periodic output amplitude variation.

Another object of the present invention is to provide a card reader comprising such a magnetic sensor.

As a result of intense research in view of the above object, the inventor has found that when a plurality of magnetoresistive portions connected to each other in series are located radially on a disc surface in a point-symmetric manner, the influence of wobbling can be eliminated. The inventor has also found that such a magnetic sensor can be used as an encoder in which the magnetic disc functions as a roller rotatable with the movement of a card.

Thus, the magnetic sensor according to the present invention comprises a rotatable magnetic disc provided on its circular surface with a circular magnet belt having N and S magnetic poles alternately at a constant pitch; and a sensor means comprising a support and at least one sensor element having a plurality of magnetoresistive portions fixed to one or both surfaces of the support, the magnetoresistive portions being connected to each other in series and arranged radially at a constant interval in a point-symmetric manner on the support.

The card reader according to the present invention comprises a magnetic encoder movable synchronously with a card being read, the magnetic encoder comprising a magnetic disc serving as a roller rotatable by the card and provided on its circular surface with a circular magnet belt having N and S magnetic poles alternately at a constant pitch; and a sensor means comprising a support and at least one sensor element having a plurality of magnetoresistive portions fixed to one or both surfaces of the support, the magnetoresistive portions being connected to each other in series and arranged radially at a constant interval in a point-symmetric manner on the support.

In the magnetoresistance-type magnetic sensor of the present invention, each of the magnetoresistive portions of the sensor element shows a resistance varying depending on an external magnetic field. If the magnetic disc is wobbling due to a slight inclination of its rotation axis, the distance between the sensor element and the disc surface would vary periodically, leading to the periodic change of an output signal. This difference can be eliminated if a pair of magnetoresistive portions connected in series always undergo the same variation of the sensor element-disc surface distance in opposite directions. This can be achieved by arranging a pair of magnetoresistive portions symmetrically with respect to a center point of the rotation of the magnetic disc. In this case, when one magnetoresistive portion nears the disc surface by the wobbling of the magnetic disc, the other magnetoresistive portion moves apart from the disc surface by the same distance. Accordingly, a total resistance of both magnetoresistive portions is always free from a factor which is introduced by the variation of the sensor element-disc surface distance.

In the present invention, the sensor element is constituted by a plurality of magnetoresistive portions connected to each other in series and arranged radially at a constant interval in a point-symmetric manner. Accordingly, the output voltage of the sensor element has always the same amplitude, free from variation due to the wobbling of the magnetic disc.

BRIEF DESCRIPTION OF THE INVENTION

Figure 1:
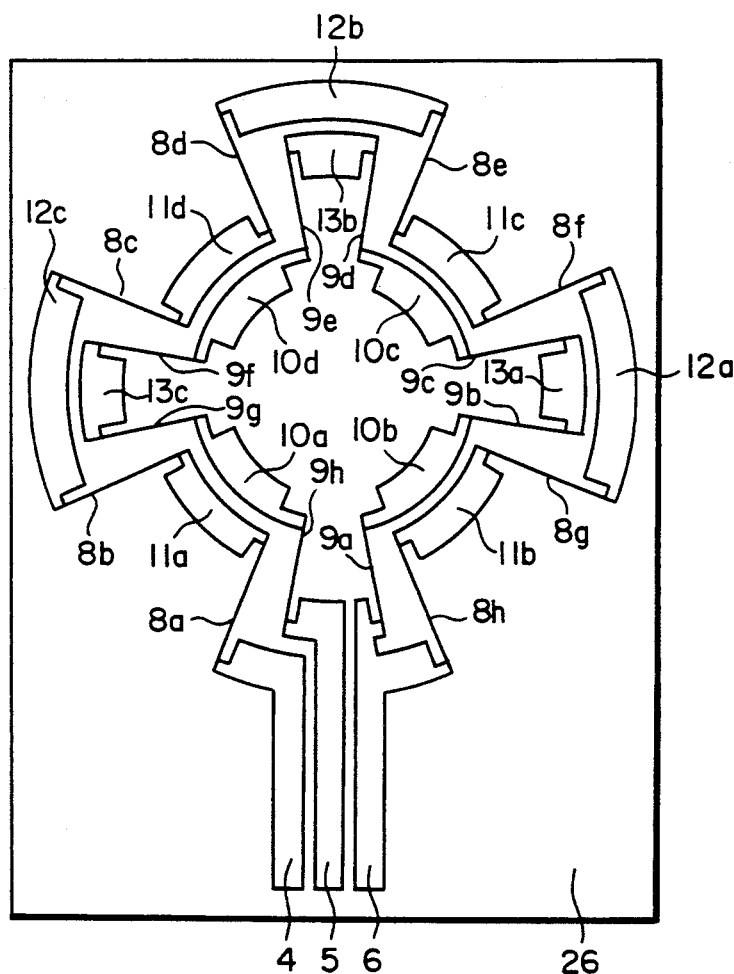
FIG. 1 is a plan view of a sensor means of the magnetic sensor according to one embodiment of the present invention.
Figure 3A:
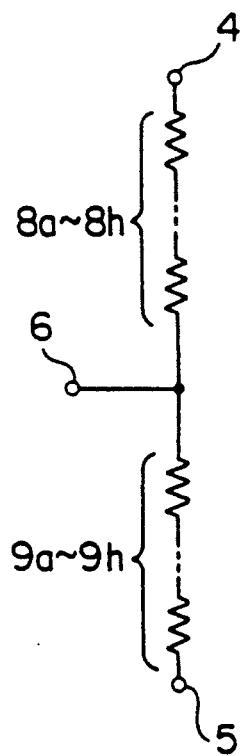
Figure 3B:
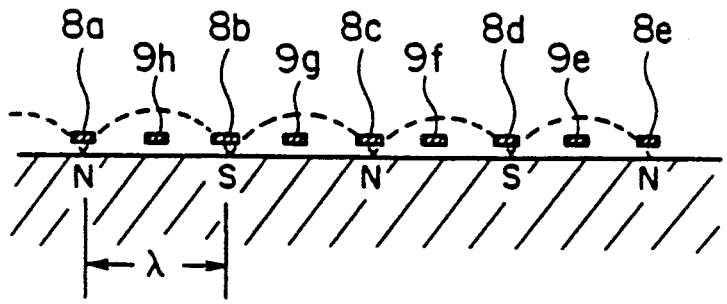
Figure 4:
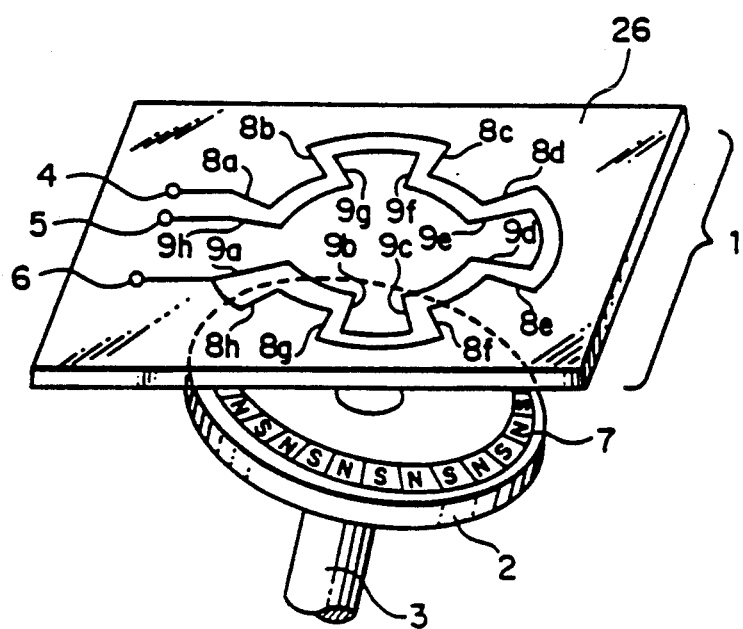
Figure 5:
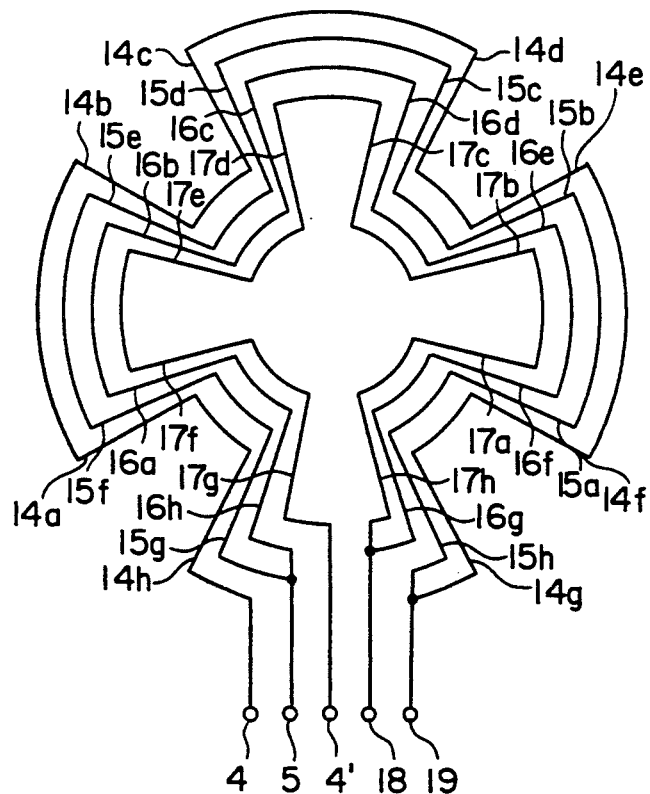
Figure 6:
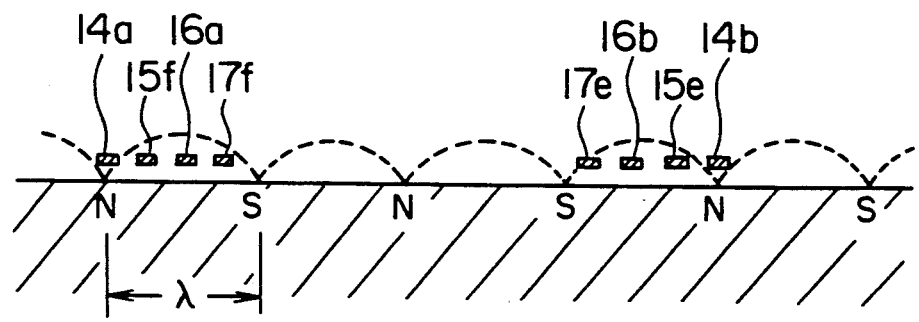
Figure 7:
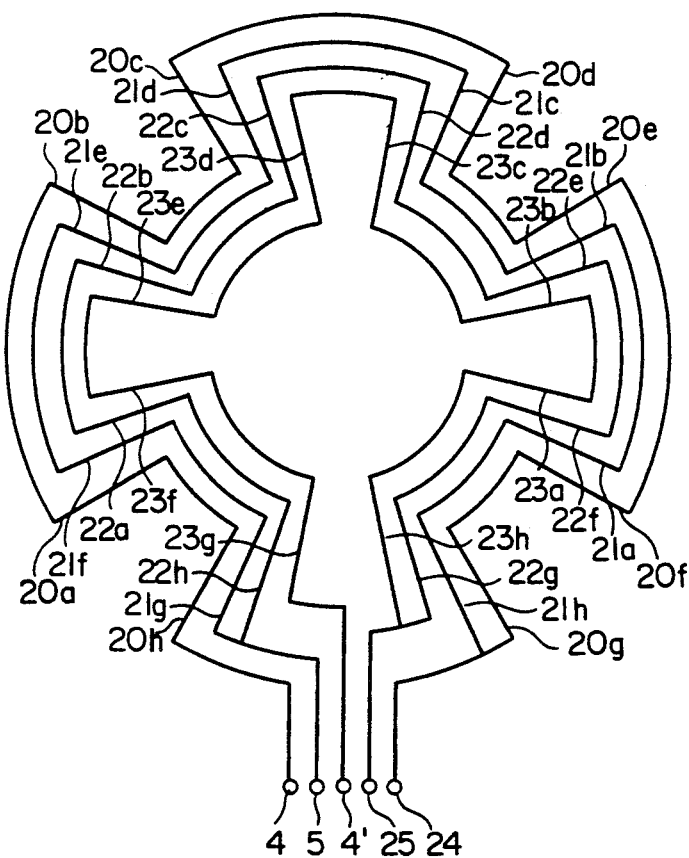
Figure 8:
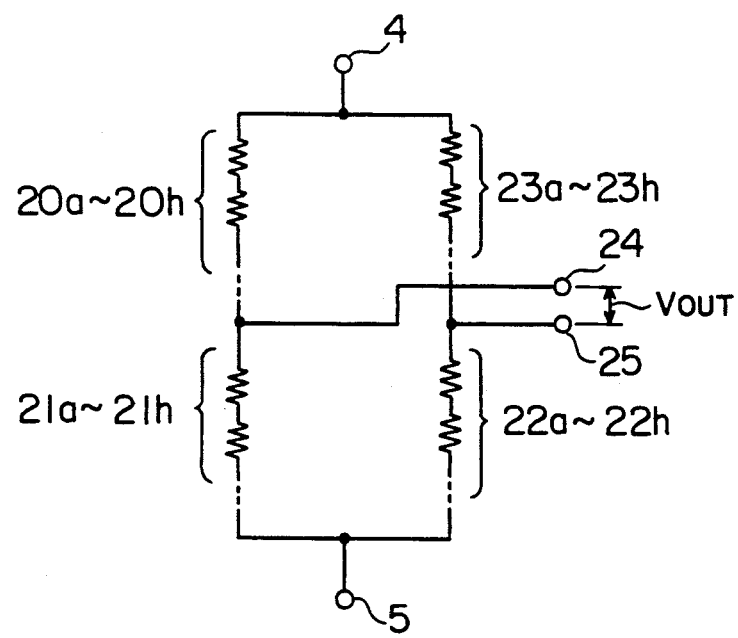
Figure 9A:
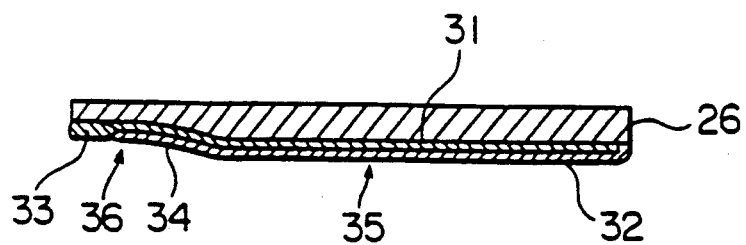
Figure 9B:
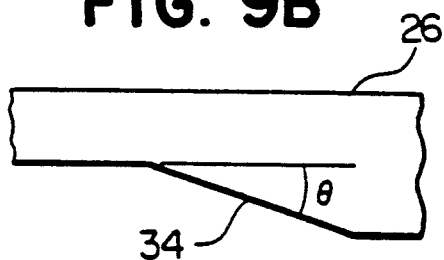
Figure 10:
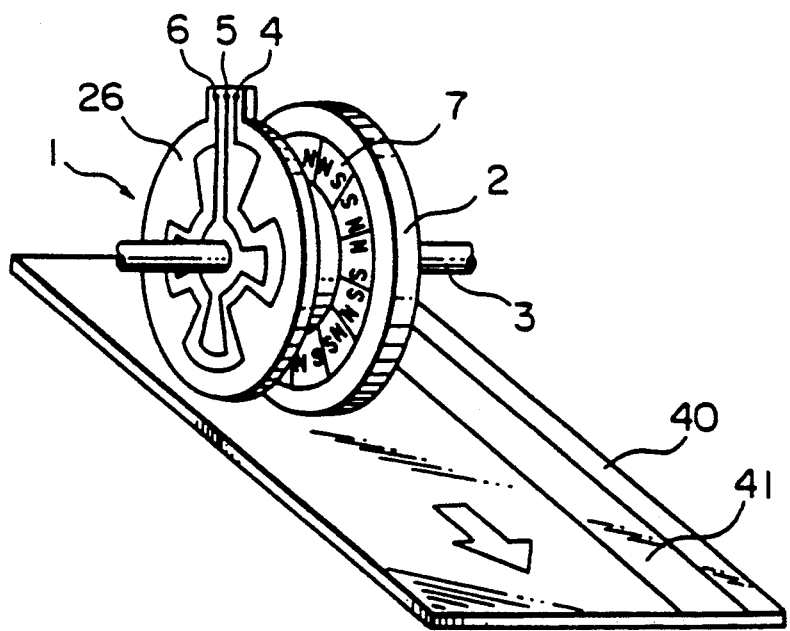
Figure 11:
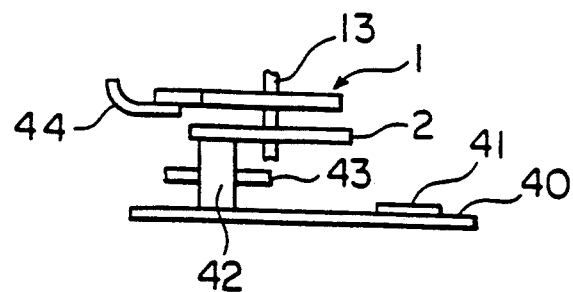
Figure 12:
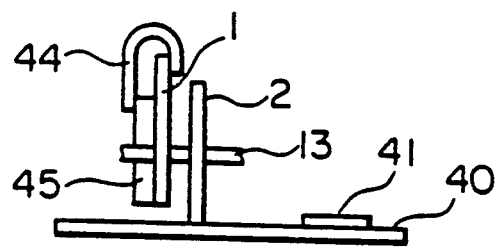
Figure 13A:
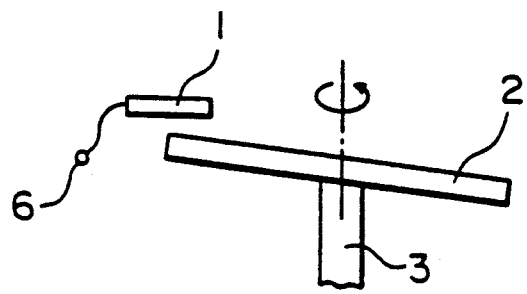
Figure 13B:
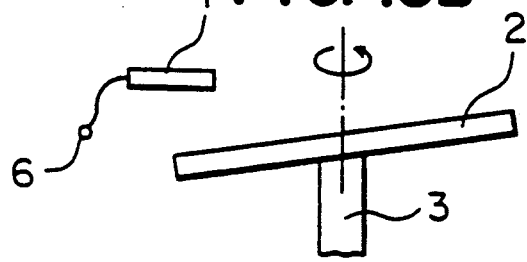
Figure 14:
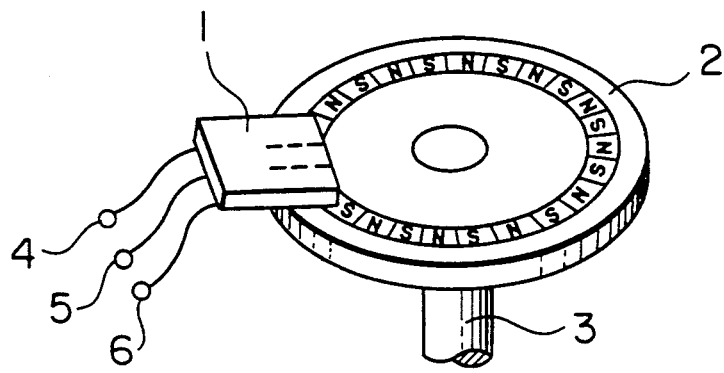
Figure 15:
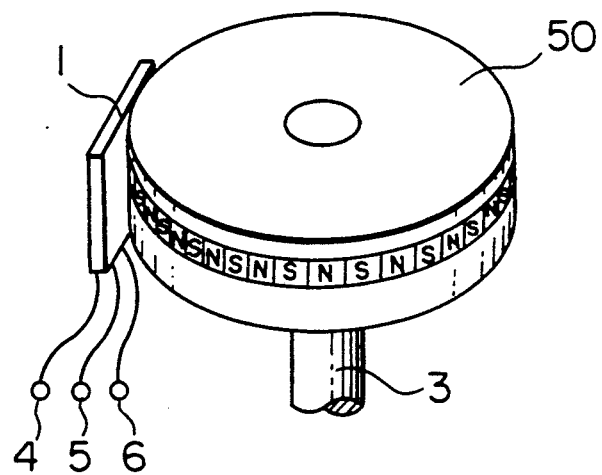

FIG. 3 A is a schematic view showing a circuit constituted by the sensor element in FIG. 1;

FIG. 3 B is a schematic view showing a positional relation between the magnetoresistive portions in the first half portion of the sensor element and the magnetoresistive portions in the second half portion of the sensor element;

FIG. 4 is a perspective view showing the magnetic disc for explaining the principle of the present invention;

FIG. 5 is a plan view showing two sensor elements according to another embodiment of the present invention;

FIG. 6 is a schematic view showing a positional relation between the magnetoresistive portions of the two sensor elements in FIG. 5;

FIG. 7 is a plan view showing two sensor elements with bridged output terminals according to a further embodiment of the present invention;

FIG. 8 is a schematic view showing a circuit constituted by the two sensor elements in FIG. 7;

FIG. 9 A is a cross-sectional view showing a transition area of the support of the sensor means according to a still further embodiment of the present invention;

FIG. 9 B is a schematic view showing an inclination angle of the transition area in FIG. 9 A;

FIG. 10 is a perspective view showing the card reader according to one embodiment of the present invention;

FIG. 11 is a side view showing the card reader according to another embodiment of the present invention;

FIG. 12 is a side view showing the card reader according to a further embodiment of the present invention;

FIGS. 13 A and B are schematic views showing the variations of a sensor element-disc surface distance in a conventional magnetic sensor;

FIG. 14 is a perspective view showing a conventional magnetic disc-type magnetic sensor; and FIG. 15 is a perspective view showing a conventional magnetic drum-type magnetic sensor.

DETAILED DESCRIPTION OF THE INVENTION

FIG. 1 shows a sensor means to be used with a rotatable magnetic disc in the magnetic sensor of the present invention. The sensor means comprises a planar support 26 and a sensor element fixed to a surface of the planar support 26. The sensor element has a plurality of magnetoresistive portions 8a–8h and 9a–9h which are formed by thin layers. The magnetoresistive portions 8a–8h, 9a–9h extend radially and are connected in series via circularly-extending conductive portions 10a–10d, 11a–11d, 12a–12c, 13a–13c, respectively. It is noted that pairs of magnetoresistive portions 8a and 8e, 8b and 8f, ... are arranged symmetrically with respect to the center point. One end of the sensor element (on the side of 8a) is connected to a power source terminal 4, and the other end of the sensor element (on the side of 9h) is connected to a ground terminal 5. A signal output terminal 6 is connected to a mid-point of the sensor element between the magnetoresistive portions 8a–8h and the magnetoresistive portions 9a–9h.

The magnetoresistive portions are usually made of ferromagnetic magnetoresistive materials such as NiFe, NiCo, etc., and they are usually formed in a thickness of 100 Å–2 $\mu$m on the support 26 made of glass, organic resins, ceramics or nonmagnetic metals, by using a thin film forming technique such as sputtering, vapor deposition, etc. However, when the support 26 is made of nonmagnetic metals, an insulating layer should exist between the sensor element and the support 26. Incidentally, a sensor element pattern may be formed by etching the thin, ferromagnetic magnetoresistive material layer formed on the support.

Figure 2:
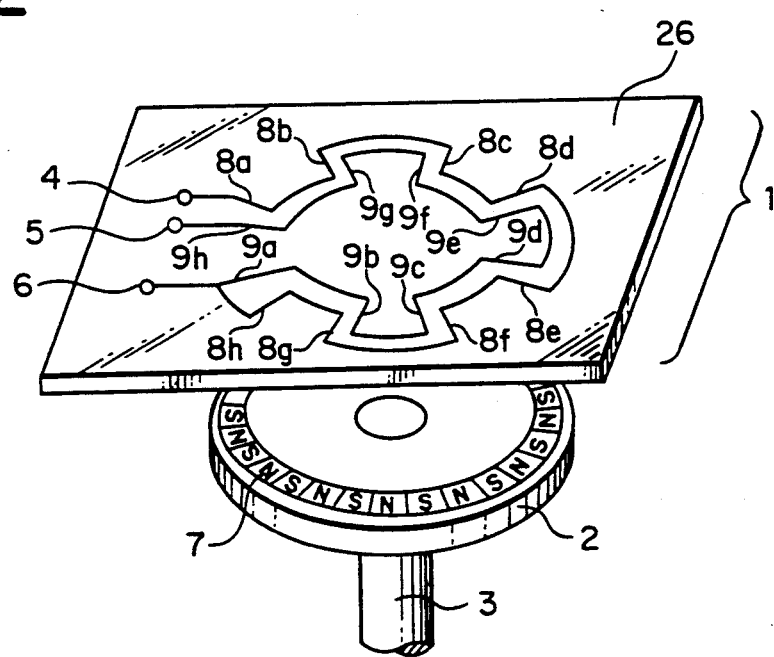
FIG. 2 is a perspective view showing the magnetic sensor according to one embodiment of the present invention.

As shown in FIG. 2, the magnetic disc 2 is positioned in the magnetic sensor such that alternating N and S magnetic poles formed on a surface of the magnetic disc 2 face the sensor element. The magnetic disc 2 is provided with a circular magnet belt 7 having alternating N and S magnetic poles on at least one surface thereof. The magnetic disc 2 is provided with a center shaft 3 for rotating it. Incidentally, the number of the magnetic poles can be selected properly depending on applications of the magnetic sensor, but it is usually within 2–5000.

Each magnetic pole is circularly located on the disc surface at a constant pitch. The magnetic pole pitch is defined herein as the distance between the adjacent N and S magnetic poles.

In the present invention, the pitch of the magnetoresistive portions 8a–8h, 9a–9h, which is defined as the circular distance between the adjacent magnetoresistive portions, is equal to the magnetic pole pitch multiplied by an integer. Accordingly, when one magnetoresistive portion is just above one magnetic pole, all the other magnetoresistive portions are also just above the corresponding magnetic poles in each of the first and second half portions of the sensor element or (9a–9h).

Incidentally, each of the magnetoresistive portions 8a–8h and each of the adjacent magnetoresistive portions 9a–9h satisfy a positional relation:

$$(\eta + \tfrac{1}{2})\lambda,$$

wherein $\eta$ is an integer and $\lambda$ is the magnetic pole pitch. For instance, the magnetoresistive portion 8a and the magnetoresistive portion 9h have a phase difference expressed by $(\eta + \tfrac{1}{2})\lambda$. A simplified example is shown in FIG. 3 in which A schematically shows a circuit constituted by the magnetoresistive portions 8a–8h and 9a–9h, and B shows the positional relation between the magnetoresistive portions 8a–8h, 9a–9h and the N and S magnetic poles. The pitch of 8a–8h and 9a–9h is equal to the magnetic pole pitch, and the phase difference between the magnetoresistive portions 8a–8h and the magnetoresistive portions 9a–9h is $\tfrac{1}{2}\lambda$. In this case, when the magnetoresistive portions 8a–8h are just above the magnetic poles, the magnetoresistive portions 9a–9h are just at middle points between the adjacent magnetic poles. Accordingly, when the total resistance of the magnetoresistive portions 8a–8h is minimum, the total resistance of the magnetoresistive portions 9a–9h is maximum, and vice versa. Thus, a maximum output voltage can be obtained from the signal output terminal 6 between the magnetoresistive portions 8a–8h and the magnetoresistive portions 9a–9h.

In FIG. 2, the sensor means 1 is usually positioned as close to the magnetic disc 2 as 10 μm–3 mm. Accordingly, even the slightest inclination of the central shaft 3 would produce unacceptable variation of the sensor element-disc surface distance, which in turn provides the output voltage with a periodic amplitude variation. This is shown in FIG. 4 in an exaggerated manner. In a state shown in FIG. 4, the magnetoresistive portions 9a and 9h are made closer to the magnetic disc 2, so that their resistances change by ($\Delta r + \Delta R$), wherein $\Delta r$ represents a resistance variation due to the change of the distance between the magnetoresistive portions and the magnetic disc 2, and $\Delta R$ represents a resistance variation due to the magnetoresistance effect. $\Delta R$ becomes positive or negative depending on the materials of the magnetoresistive portions. On the other hand, the magnetoresistive portions 9d and 9e undergo a resistance change of ($-\Delta r + \Delta R$). Since the resistance variation between the signal output terminal 6 and the ground terminal 5 is a sum of the resistance variations of all the magnetoresistive portions connected in series, it is as follows:

$$2(\Delta r + \Delta R) + 2(-\Delta r + \Delta R) + 4\Delta R = 8\Delta R.$$

As is clear from the above, since the magnetoresistive portions are positioned in a point-symmetric manner relative to each other, the influence of $\Delta r$ which is caused by the wobbling of the magnetic disc 2 can be offset completely. As a result, the output voltage does not contain the factor of $\Delta r$, and it is determined only by $\Delta R$ which depends on the materials of the magnetoresistive portions. The same effect can be obtained with respect to the magnetoresistive portions 8a–8h. As a result, the output voltage always has a constant amplitude.

FIG. 5 shows a sensor element according to another embodiment of the present invention, which can provide two output signals having different phases (A phase output and B phase output). This sensor element comprises two power source terminals 4, 4', one ground terminal 5 and two signal output terminals 18, 19. A first series of magnetoresistive portions 14a–14h, 15a–15h exist between the power source terminal 4 and the ground terminal 5, a mid-point of which is connected to a first signal output terminal 19 for the A phase output. A second series of magnetoresistive portions 16a–16h, 17a–17h exist between the power source terminal 4' and the ground terminal 5, a mid-point of which is connected to a second signal output 18 for the B phase output.

The phase difference between the A phase output and the B phase output is determined by a pitch of the magnetoresistive portions. In this embodiment, since the magnetoresistive portions are arranged radially at the same pitch, which is $\frac{1}{2} \lambda$ between 14a–14h and 16a–16h, and between 15a–15h and 17a–17h as shown in FIG. 6, the phase difference between the A phase output and the B phase output is 90° in an electrical angle. Incidentally, in each series of the magnetoresistive portions, the influence of $\Delta r$ caused by the wobbling of the magnetic disc 2 can be eliminated as in FIG. 1.

FIG. 7 shows a sensor element according to a further embodiment of the present invention. In this embodiment, the sensor element has a circuit shown in FIG. 8. In a first series of magnetoresistive portions 20a–20h, 21a–21h between a power source terminal 4 and a ground terminal 5, the phase difference between the magnetoresistive portions 20a–20h and 21a–21h is $(\eta + \frac{1}{2}) \lambda$, wherein $\eta$ is an integer and $\lambda$ is a magnetic pole pitch. The same is true of a second series of magnetoresistive portions 22a–22h and 23a–23h. Further, the magnetoresistive portions 20a–20h, 22a–22h and the magnetoresistive portions 21a–21h and 23a–23h respectively have a phase difference of $\eta\lambda$, namely the same phase.

The above relation is schematically shown in FIG. 8. In FIG. 8, because of the above phase differences, when magnetoresistance is maximum in 20a–20h, it is minimum in 21a–21h. At the same time, magnetoresistance is maximum in 22a–22h and it is minimum in 23a–23h. Next, when magnetoresistance is minimum in 20a–20h, the magnetoresistance becomes opposite in the other magnetoresistive portions, and this relation occurs periodically. Output voltage $V_{out}$ is obtained between the two terminals 24, 25 connected to mid-points of the first and second series of magnetoresistive portions, respectively. This circuit may be called a bridge circuit, and this can eliminate from the output voltage $V_{out}$ influence by temperature variation caused by surrounding parts. Thus, by this bridge circuit, the sensor element can be made highly stable. In addition, this bridge circuit can provide output voltage with doubled amplitude. Also, this bridge circuit is advantageous in providing an alternating component only.

In the present invention, since the magnetoresistive portions are arranged in the entire circle of the magnetic disc at a constant interval in a point-symmetric manner, a stable output signal free from amplitude variation can be obtained.

FIG. 9 shows a support of the sensor means, which has a transition area 34 having a gradually decreasing height. The sensor element 31 is formed on the surface of the support 26, with magnetoresistive portions on a high area 35 of the support 26 and with terminals partly on a low area 36 of the support 26. An entire surface of the sensor element is coated with a protective layer 32. Solder portions 33 are connected to the terminals in the low area 36. Since the total thickness of the terminal area including wires, the solder portions, etc. is usually 0.1 mm–1 mm, the difference between the high area 35 and the low area 36 should be as large as 0.1 mm–1 mm. Because of this structure, the terminals and the solder portions 33 which are thick as compared with the magnetoresistive portions do project exceeding the level of the protective layer 32. Therefore, the collision of the sensor means with the disc surface can completely be prevented. Incidentally, the transition area 34 is desirably a slope having an inclination angle $\theta$ of 10°–80°. If the inclination angle $\theta$ is larger than 80°, the sensor element constituted by a thin film is likely to be cut. And if the inclination angle $\theta$ is smaller than 10°, the transition area 34 is too long, undesirable for the purpose of miniaturization.

FIG. 10 shows a reader comprising a magnetic encoder constituted by a ma disc 2 and a sensor means 1. The magnetic disc 2 has a magnet belt 7 having a plurality of magnetic poles its surface and is rotatable about a central shaft 3. The magnetic disc 2 serves as a roller, because its side surface brought into contact with a card 40 moves synchronously with the card 40. The sensor means 1 is stationary relative to the magnetic disc 2 and may have the same sensor element as shown in FIGS. 1, 5 and 7.

In this card reader, when the card 40 is moved, the magnetic disc 2 rotates simultaneously, so that the magnetic encoder generates an output signal which shows the position of the card 40. The output signal from the magnetic encoder is supplied to a control unit (not shown) which generates a signal for starting the reading of memory stored in a magnetic coating area 41 of the card 40. Since the output signal of the magnetic encoder represents the position of the card 40, not depending on the moving velocity of the card 40, exact reading of the card 40 can be achieved no matter how fast the card 40 is moved. Incidentally, when some data are written in the card 40, the same principle works, making sure that data are written in exact portions in the magnetic coating area of the card 40.

FIG. 11 shows a card reader according to another embodiment of the present invention. In this embodiment, a magnetic disc 2 rotates with the movement of a card 40 via a roller 42 having a central shaft 43. An output signal generated by this magnetic encoder is obtained through a wire 44.

FIG. 12 shows a card reader according to a further embodiment of the present invention. In this embodiment, a magnetic disc 2 is arranged in perpendicular to a card 40 as in FIG. 10. A sensor means 1 is fixed to a substrate 45, a circuit on which is connected to a sensor element of the sensor means 1 via a wire 44.

The present invention has been explained referring to the above embodiments, but it should be noted that any modifications can be made unless they deviate from the scope of the present invention. For instance, although 8 magnetoresistive portions are arranged in one circle of the sensor element in FIGS. 1, 5 and 7, the number of the magnetoresistive portions can be increased for the purpose of increasing output voltage. In addition, since this leads to the increase in a total resistance, the consumption of electricity by the magnetic sensor can be reduced. Further, in the embodiment in FIG. 7, if two different phase outputs (A phase output and B phase output) are needed, additional 32 magnetoresistive portions need only be added with a phase difference of $(\eta + \frac{1}{2}) \lambda$ relative to the magnetoresistive portions 20a-20h, . . .

According to the present invention, the rotary magnetic disc-type magnetic sensor capable of providing an output signal substantially free from amplitude variation can be obtained. Therefore, the magnetic sensor of the present invention is highly effective to extremely stabilize the output signal. Also, since the magnetic sensor generates an output signal showing the position of a card, the card reader of the present invention comprising such magnetic sensor can exactly read or write data without being affected by the moving velocity of the card.

What is claimed is:

1. A magnetic sensor comprising: a rotatable magnetic disc having a circular surface, with a circular magnetic belt disposed on said surface including N and S magnetic poles alternately arranged at a constant pitch; and a sensor means comprising a support and at least one sensor element having a plurality of magnetoresistive portions fixed to at least one surface of said support, said magnetoresistive portions being connected to each other in series and arranged radially at a constant interval in a point-symmetric manner on said support, for sensing rotation of said disc.

2. The magnetic sensor according to claim 1, wherein said sensor element has three terminals consisting of a power source terminal connected to one end of said sensor element, a ground terminal connected to the other end of said sensor element, and a signal output terminal connected to an intermediate point of said sensor element.

3. The magnetic sensor according to claim 2, wherein said magnetoresistive portions in a first half portion of said sensor element between said power source terminal and said signal output terminal, and said magnetoresistive portions in a second half portion of said sensor element between said signal output terminal and said ground terminal satisfy a positional relation represented by the formula:

$$(\eta + \tfrac{1}{2}) \lambda,$$

wherein $\eta$ is an integer and $\lambda$ is a pitch of the magnetic poles.

4. The magnetic sensor according to claim 3, wherein said magnetic sensor has two sensor elements arranged at such a pitch that output signals of said two sensor elements show a phase difference of 90°.

5. The magnetic sensor according to claim 3, wherein said magnetic sensor is a bridge-type circuit including two sensor elements having output terminals, said two sensor elements being arranged at such a pitch that the magnetoresistive portions in the first half portions of both sensor elements, and those in the second half portions of both sensor elements respectively have opposite phases.

6. The magnetic sensor according to claim 1, wherein said support of said sensor means has a transition area between said magnetoresistive portions and said terminals, in which the height of said support gradually decreases from the side of said magnetoresistive portions to the side of said terminals.

7. The magnetic sensor according to claim 6, wherein said transition area has an inclination angle of 10°-80° with respect to a flat surface of said support.

8. A card reader comprising: a magnetic encoder movable synchronously with a card being read, the magnetic encoder including a magnetic disc rotatable by the card having a circular surface, with a circular magnetic belt disposed on said surface including N and S magnetic poles alternately arranged at a constant pitch; and a sensor means comprising a support and at least one sensor element having a plurality magnetoresistive portions fixed to at least one surface of said support, said magnetoresistive portions being connected to each other in series and arranged radially at a constant interval in a point-symmetric manner on said support, for sensing rotation of said disc.

9. A magnetic sensor, comprising:
a rotatable magnetic disc having a circular planar surface with a circular magnetic belt disposed on said surface, said magnetic belt including N and S magnetic poles alternately arranged at a constant pitch; and
sensor means comprising a planar support disposed in generally parallel relationship relative to said magnetic disc surface, and at least one sensor element having a plurality of magnetoresistive portions fixed to at least one surface of said support, said magnetoresistive portions being connected to each other in series and arranged radially at a constant interval in a point-symmetric manner on said support, for sensing a change in position of said magnetic poles upon rotation of said disc, and providing an electrical output representing the disc position, said electrical output being unaffected by a variation in the parallel relationship between said disc and said sensor means.

* * * * *